July 30, 1957  J. FLOCKHART  2,800,980
TRACTOR TRAILER AIR BRAKE SYSTEM
Filed July 2, 1953  3 Sheets-Sheet 1

INVENTOR.
James Flockhart
BY
Martin E. Anderson
ATTORNEY

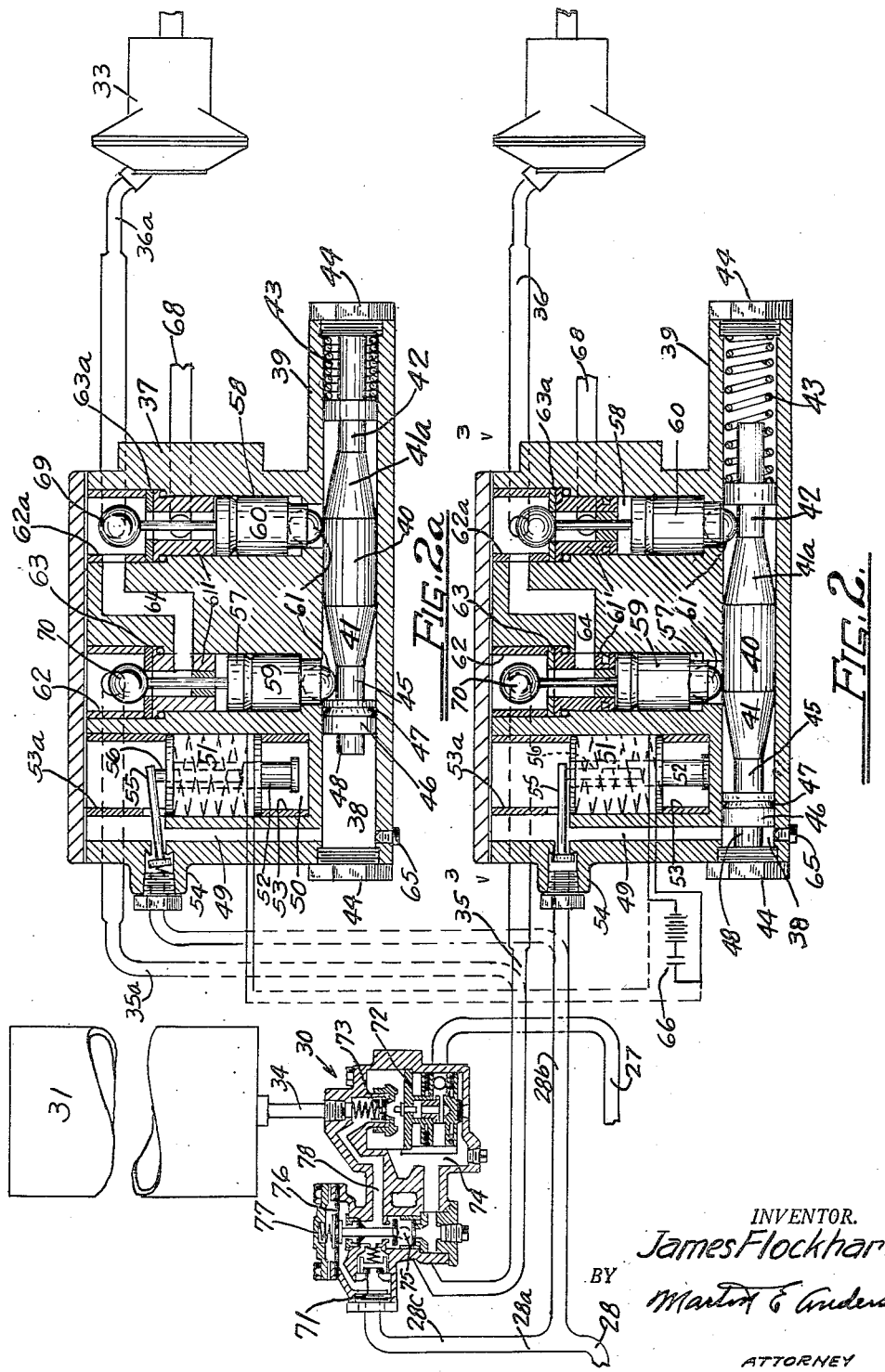

July 30, 1957
J. FLOCKHART
2,800,980
TRACTOR TRAILER AIR BRAKE SYSTEM
Filed July 2, 1953
3 Sheets-Sheet 3
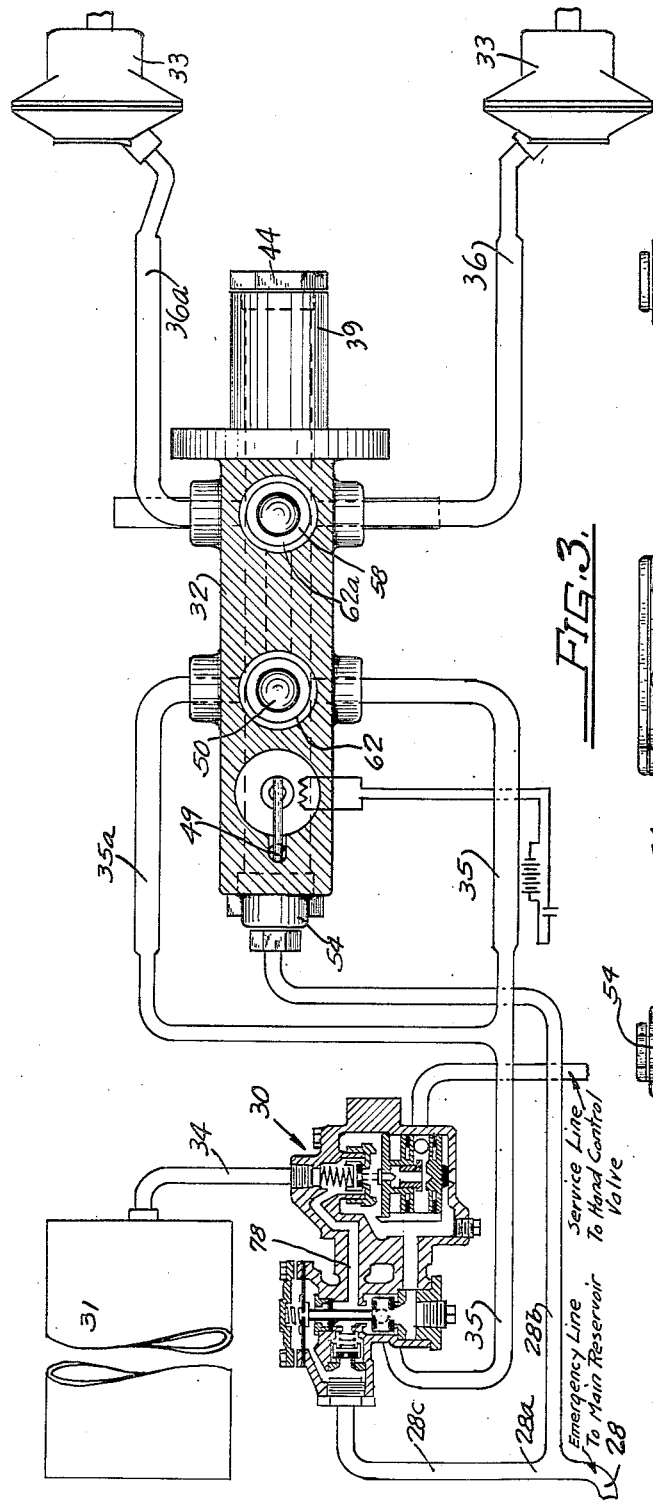
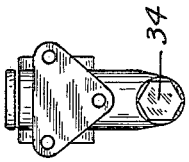
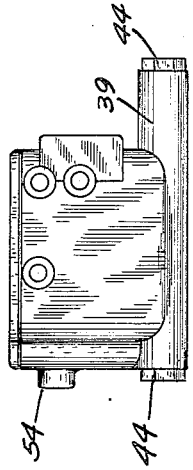
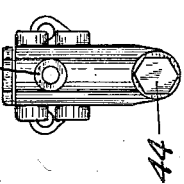
INVENTOR.
James Flockhart
BY
Martin E. Anderson
ATTORNEY United States Patent Office 2,800,980
Patented July 30, 1957

2,800,980

TRACTOR TRAILER AIR BRAKE SYSTEM

James Flockhart, Denver, Colo.

Application July 2, 1953, Serial No. 365,658

4 Claims. (Cl. 188—3)

This invention relates to improvements in compressed air brakes for tractor trailer equipment.

It is well understood that with transportion devices of the type in which a trailer is attached for pivotation about a vertical axis it is necessary for safety that the brakes on the trailer shall be applied before the brakes are applied to the tractor and the usual braking systems are so designed that this is effected by some means. In at least one such system the brakes on the trailer are controlled by a hand control valve of the usual type, independently of the brakes on the tractor which are independently controlled by a foot control valve. By this means the operator can control the trailer brakes independently and can snub the trailer brakes at any time regardless of the position of the tractor brakes.

The trailer is provided with an emergency air reservoir to which air is supplied from the main reservoir on the tractor through the emergency line. The air for applying the brakes to the trailer may come from the emergency reservoir or from the tractor reservoir or part from each and the application and release of the brakes are controlled by the operator by means of the hand control valve on the tractor. The hand control valve is positioned as far as fifty feet from the relay quick release emergency valve on the trailer and since the service line connecting the two must have its pressure greatly reduced in order to effect a release of the trailer brakes, there will, first of all, be a loss of a considerable quantity of air and secondly there will be a considerable time lag between the time that the operator moves his control valve and the time that the brakes are released. In moving down an incline it frequently becomes necessary to release the trailer brakes instantly and to reapply them with the same speed.

It is the object of this invention to add to the standard pneumatic tractor trailer brake systems an electro-pneumatic diverter whose operation is controlled by a normally open switch or circuit closer positioned adjacent the hand control valve, by means of which the trailer brakes can be instantly released by closing said switch and reapplied as quickly by opening the switch.

It is a further object to so position the diverter with respect to the trailer brakes that only a negligible quantity of air is lost during each brake release.

One highly desirable and essential feature of the invention is that the trailer brakes can be snubbed entirely independently of the fact that the hand control valve is in full brake on position.

Another and very important object of this invention is to make it possible to release the trailer brakes and to reapply them at a time when the air pressure in the emergency line has been reduced to such a low value that the brakes cannot be released in the usual way.

A still further object is to provide a valve control or operating mechanism by means of which valves controlling air under high pressure can be opened by means employing air at a much lower pressure.

Having thus set out the objects of the invention and outlined in a general way its operation, the invention will now be described in detail for which purpose reference will now be had to the accompanying drawings in which the invention has been illustrated and in which Figure 1 is a diagram showing a compressed-air tractor-trailer brake system of usual design which has been modified in accordance with this invention;

Figure 2 is a view of the parts carried by the trailer, the electro-pneumatic diverter that has been added being shown in section in normal or brake applied position;

Figure 2a is a view similar to Figure 2 and shows the parts in trailer brake release position;

Figure 3 is a sectional view of the relay release emergency valve taken on line 3—3, Figure 2 showing also the electro-pneumatic diverter in section;

Figure 4 is an end elevational view looking towards the right in Figure 3;

Figure 5 is an end elevational view looking towards the left in Figure 3 and

Figure 6 is a side elevational view looking upwardly in Figure 3.

Figure 1:
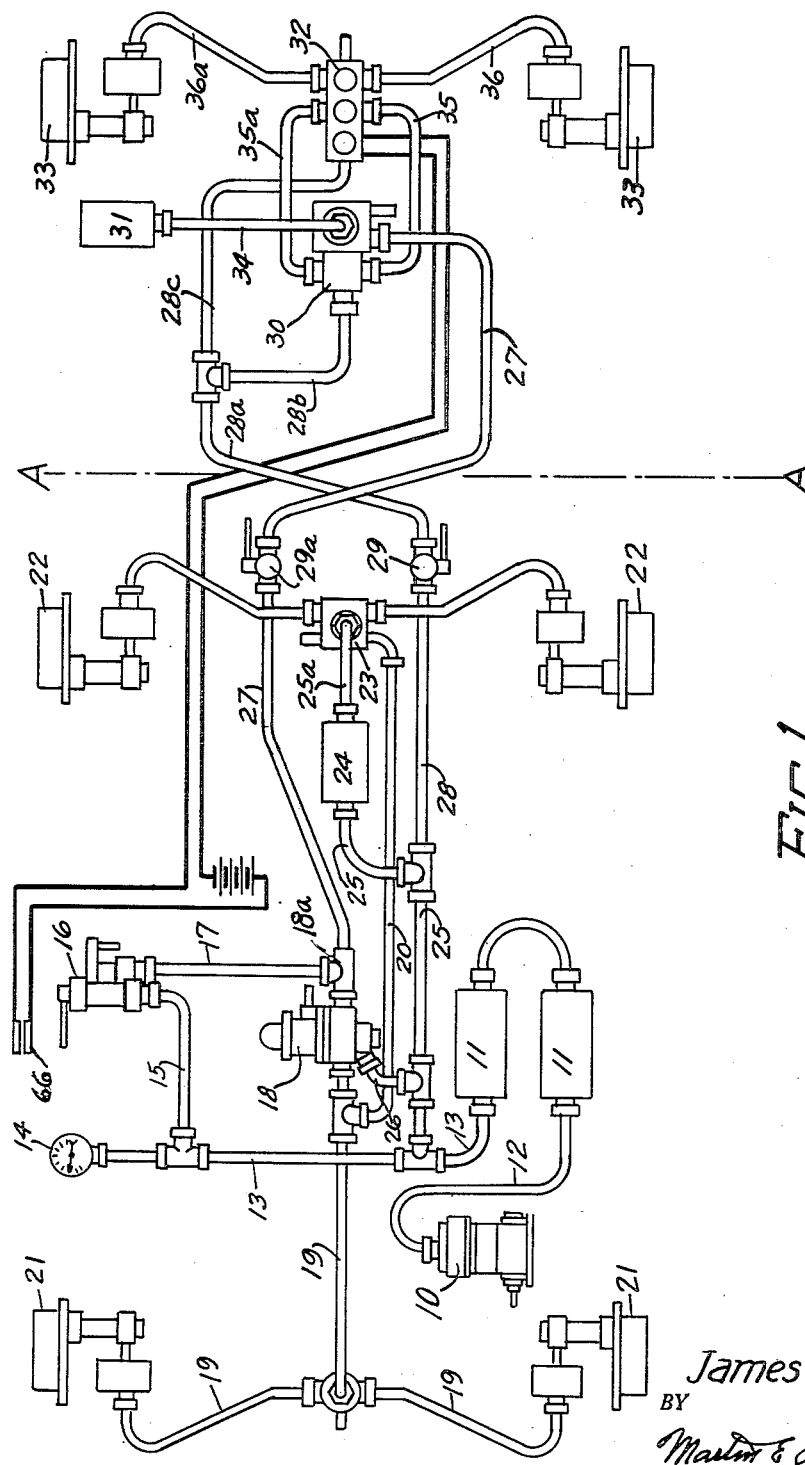

Referring now to the drawing, reference numeral 10 designates the air compressor on the tractor, and 11 the main pressure reservoir which is connected to it by pipe 12. A pipe 13 connects the reservoir with the pressure gauge 14 and pipe 15 connects pipe 13 with the hand control valve 16. Pipe 17 connects the hand control valve with the two-way check-valve 18a which connects it and the foot control valve 18 with service line 27. Pipe 25 communicates with pipe 13 and is also in communication with the foot control valve through pipe 26. Pipe 25 has a branch pipe that is in communication with reservoir 24 from which pipe 25a extends to the relay quick release valve 23 and this in turn is connected with brakes 22 as shown. Pipe 28 forms an extension of emergency pipe 25 and terminates in valve 29.

Service line 27 terminates in valve 29a. The parts so far described are all on the tractor. That part to the right of line A—A on the drawing represents the trailer. Carried by the trailer are the relay quick release emergency valve 30, the trailer or emergency pressure reservoir 31, the electro-pneumatic cut off and exhaust valve 32 which for convenience will be referred to hereinafter by the terms diverter or diverter valve and the brakes 33, also the various pipes to which attention will presently be directed.

Valve 29 connects the emergency line with extension 28a which has two branches, 28b and 28c, that connect line 28a with the quick release emergency valve 30 and with the diverter valve 32 respectively. Service line 27 extends from valve 29a to the quick release emergency valve 30. Pipe 34 connects valve 30 with the emergency pressure reservoir. Short pipes 35, 35a connect valve 30 with diverter 32, and are in communication with brake cylinder lines 36 and 36a through the diverter valve.

Reference will now be had more particularly to Figures 2, and 2a which show two longitudinal sections that are identical except for this, that Figure 2 shows the parts in normal operative position while Figure 2a shows them as they are when the brakes 33 have been released.

The diverter consists of a steel block or body 37 that is provided near its bottom with a cylindrical opening 38 that has been shown as longer than the block and extends into a prolongation 39. Slidable in said opening is a combined piston and cam member having a central cylindrical portion 40 that terminates at its ends in frustoconical cam surfaces 41, 41a, the latter of which has a cylindrical projection 42 that extends into compression spring 43. Projection 42 is of such length that it can engage the inner end of plug 44 in the end of prolongation 39, as shown in Figure 2a. Cam 41 terminates in a cylindrical section 45 and this in turn terminates in piston 46 that is provided with a cup rubber seal 47. The piston has a short projection 48 that serves as a limit stop. Block 37 is provided with a passage 49 whose lower end is in communication with opening 38 and whose upper end is in communication with a cylindrical depression 50 in which is positioned a solenoid 51 having a plunger armature 52. The solenoid is held in place by tubular cylindrical spacer sleeves 53 and 53a. A tubular hub 54 is in communication with passage 49 through a valved opening which is normally closed by a pressure closing valve whose stem has been designated by reference numeral 55. Plunger 52 has an upwardly projecting portion 56 that engages valve stem 55 and tilts the valve to open position, as shown in Figure 2a, when the solenoid is energized. The block is also provided with two additional cylindrical openings which have been designated by numerals 57 and 58 each of which has three sections of different diameter, the smaller being at the bottom and the larger at the top. Pistons 59 and 60 are positioned in openings 57 and 58 respectively and are sized to reciprocate in the intermediate section of the cylinders. Each piston is provided with a cup seal, 59a and 60a, and terminates at its lower end in a short section of smaller diameter whose lower end is cupped for the reception of a ball 61 that normally rests on the outer surface of the cam member as clearly shown in the drawing. Each cylindrical opening 57, 58 has a tubular cylindrical stop member 61' whose upper end has a flange of a diameter substantially the same as the top section of the cylindrical opening in which it is positioned and this flange is separated from the shoulder between the two sections of different diameters and is spaced from it by a gasket as shown. Cylindrical sleeves 62, 62a hold the stop members in position. Suitable gaskets and seals are used wherever needed. Washer-like members 63, 63a are positioned between sleeves 62, 62a and their respective stop members 61'. A passage 64 connects the space below the washer-like member 63 with the top of cylinder 58. Pistons 59 and 60 are each provided with an axial extension that projects above the plane of the top of members 63 and 63a and pushes the corresponding ball valve member from its seat when the piston moves to its uppermost position but allows the ball to seat when the piston is at its lowermost position, all as shown in the drawing. Cylindrical opening 38 is provided with an exhaust vent 65. It will be observed that pipes 35 and 35a (Figure 1) which connect valve 30 directly to the brakes of the trailer when diverter 32 is not used, are now each formed from 2 parts 35, 36 and 35a, 36a. Pipes 35, 35a both terminate in the upper part of cylindrical opening 57 (Fig. 2) which is in communication with the upper part of cylindrical opening 58 through passage 64. Please note that passage 64 is in communication with cylinder 57 at a point below valve seat 63 so that when the ball is in the position shown in Figure 2 there is a clear passage from pipes 35, 35a to passage 64 but when the parts are in the position shown in Figure 2a this communication is closed. Brake pipes 36, 36a are both in communication with the top of cylindrical opening 58 and therefore the diverter does not in any way interfere with the usual and normal operation of the air brakes. The trailer brakes can be applied and released by the foot and the hand control valves as usual. It has been pointed out above that the system as normally used is objectionable and a source of danger on account of the lag between the time that the operator moves the valve to off position and the release of the brakes and there is also a corresponding lag in applying the trailer brakes. With the diverter parts in the position shown in Figure 2 it does not in any way offset the normal and usual operation.

When the operator feels that the trailer is skidding he knows that he must release the brakes at once and operates the hand control, but due to the time lag of one or two seconds the brakes release too late and the outfit is wrecked.

In certain cases where the air pressure in the main reservoir and in the emergency line has been greatly reduced spring 77 flexes diaphram 76, opens valve 75 and dumps air from the emergency reservoir into the brakes and locks them so that they cannot be released by the hand or foot valves until equalizing pressure in the emergency line is again built up, thereby causing serious wrecks.

Attention will now again be directed to Figures 2 and 2a. In Figure 2 the ball 69 that is controlled by piston 60 is seated on 63a and the exhaust passage between pipe 36 and exhaust opening 68 is closed.

When an emergency arises that requires a quick release of the trailer brakes the operator closes the normally open push button switch 66 and current therefor flows from battery 67 causing plunger 56 in solenoid 51 to rise and open the normally closed valve in hub 54 allowing compressed air to flow into passage 49 and into opening 38 and this moves piston 46 and attached parts to the position shown in Figure 2a. The ball valve 70 controlled by piston 59 now seats on 63 and cuts off the air supply to passage 64. Piston 60 moves upwardly from the position shown in Figure 2 to that shown in Figure 2a and allows air from pipes 36, 36a to flow out through exhaust 68 whereupon the brakes release. Attention is called to the fact that piston 60 must be moved against the full pressure in pipes 36 and 36a.

When the operator removes pressure from switch 66, solenoid 51 is immediately deenergized and the plunger armature drops to its normal position shown in Figure 2 and the valve in hub 54 returns to closed position.

The air in passages 49 and 38 escapes through exhaust orifice 65 allowing piston 46 and attached parts to return to the position shown in Figure 2 whereupon air under pressure again enters the brake lines and applies the brakes. The volume of air in passage 49 and 38 is small and the opening in orifice 65 is selected of such size that the pressure will be reduced almost instantaneously to an amount that permits spring 43 to return piston 46 from the position shown in Figure 2a to that shown in Figure 2. Since pipes 36, 36a are short very little air is lost each time the breaks are released and the release takes place practically simultaneously with the movement of piston 46 and attached parts from the position shown in Figure 2 to that shown in Figure 2a. The valve controlled by piston 59 closes before the air pressure in passage 64 has been appreciably reduced and there is therefore very little if any air lost from the main supply. Since the pipes 36, 36a are short the brakes can be released and reapplied in frequent succession and the trailer brakes can be released approximately at the instant that switch 66 is closed and will be reapplied almost simultaneously with the opening of the switch. As long as switch 66 remains open the air brakes on the trailer are controlled in the usual way by hand control 16.

Reference is made above to a condition in which the main air pressure has been reduced by repeated application of the tractor brakes to such a low value that the relay quick release valve automatically dumps the emergency air into the trailer brake lines under which conditions the trailer brakes cannot be released by operation of the hand control valve, which is the cause of frequent serious accidents.

In the following part of the specification it will be explained how the present invention overcomes this serious fault.

*Operation*

Referring now to Figure 1 it will be seen that the main air pressure reservoir is connected with the quick release emergency valve 30 and with the electro-pneumatic diverter by pipes 13, 25, 28, 28a, 28c and 28b which reference characters merely designate sections of the same air line.

Referring now more particularly to Figures 2, 2a and Figure 3 it will be seen that valve 30 and the valve chamber in hub 54 are always in direct communication with the main pressure reservoir. The trailer or emergency pressure reservoir 31 is in communication with the main pressure reservoir through passages in valve 30 as is clearly shown. Since the Wagner relay quick release valve 30 is a well known product whose operation is understood by all that are skilled in this art it will not be described in detail and reference will merely be made to such parts thereof as may be necessary for an understanding of the operation of the diverter. Service line 27 extends to the hand control valve 16 by means of which any desired air pressure up to 80 pounds may be supplied to it and to valve 30 for controlling the release of air from reservoir 31. The air released from the emergency reservoir will enter the brake pipes 35 and 36 at the pressure determined by the setting of the hand control valve. The normal operation of the system has not been altered by the addition of the diverter which normally serves as a coupling between pipes 35 and 36.

When it becomes necessary to release the brakes to prevent dangerous skidding or to resort to frequent snubbing of the trailer brakes the operator leaves the control valve in brake on position and opens and closes switch 66. When switch 66 is closed solenoid 51 is energized and the valve stem 56 in hub 54 is opened whereupon air flows into passage 49 and into cylinder 38 moving piston 46 and attached parts towards the right in opposition to the force exerted by spring 43. In the normal position with switch 66 open the parts are as in Figure 2 and an unobstructed passage is provided for air from pipes 35 to pipes 36. Piston 60 occupies its lowermost position and ball 69 rests on valve seat 63a closing the passage to exhaust pipe 68. When piston 46 moves towards the right, piston 60 will be raised by the cam action of surface 41a on ball 61 thereby raising ball 69 providing a passage for air from pipes 36, 36a to exhaust 68 to release the brakes. It will be observed that when piston 60 moves upwardly piston 59 moves downwardly and ball 70 comes to rest on valve seat 63 and prevents the escape of air from pipes 35 and 35a. As soon as switch 66 is opened spring 43 returns the parts to the position shown in Figure 2. Since the movement of the parts takes place almost at the instant that the switch closes and opens it is evident that the brakes may be released and reapplied in quick succession and with the loss of an insignificant amount of air, since pipes 36, 36a are comparatively short.

Attention is now directed to an important feature of the invention. Trailer or emergency pressure reservoir 31 is charged directly from the main reservoir in which pressures as high as 100 pounds per square inch or more are carried. Since air can pass from pipe 28 through check valve 71 into the emergency reservoir the latter will attain the same pressure as that in the main reservoir or nearly so. Under normal operation the operator applies the brakes to the trailer by setting the hand or foot control valve to supply to service pipe 27 the proper braking pressure. The air from pipe 27 moves piston 72 upwardly and opens check valve 73 whereupon air flows from the emergency pressure reservoir into passage 74 and thence into pipe 35 past valve 75 which is held in raised position by the action of the air pressure in the emergency air line which acts on the under surfaces of diaphram 76. When the pressure in passage 74 reaches the value of the air pressure in the service line, piston 72 will permit check valve 73 to close so that the air pressure in brake pipes 35, 36 can be controlled by the operator.

In traveling down long inclines the operator usually finds it necessary to snub the trailer wheels by periodically releasing and applying the brakes. Due to the time lag between the release of air from the service line at the hand control valve and the release of the brakes on the trailer serious accidents occur and this is overcome by means of the apparatus that has been described. When the operator desires to release the trailer brakes he closes switch 66 whereupon the parts move immediately to the position shown in Figure 2a, opening a passage from the brake lines to exhaust 68 and closing supply valve 70 to prevent the loss of air.

The frequent application and release of the tractor and trailer brakes frequently reduces the pressure in the service line to such a point that spring 77 moves diaphram 76 downwardly to the position shown in the drawing and provides a direct communication from the emergency pressure reservoir to brake pipe 35 through passage 78 thereby subjecting the trailer to maximum braking action frequently locking the trailer wheels and causing dangerous skidding. When this occurs the brakes cannot be released by the use of the hand control valve until the pressure in the emergency line is restored to a value that will flex diaphram 76 upwardly and close communication between passage 78 and pipe 35 which can only be accomplished by operating the compressor.

When the emergency pressure reservoir is dumped into the brake pipes as above explained the operator is unable to release them with serious consequences.

In the event just described the operator can release and reapply the brakes by operating switch 66. When switch 66 is closed the parts move to the position shown in Figure 2a and the brakes are released.

Attention is called at this point to the fact that when the air pressure in the emergency line is so low that the emergency tank is connected with the brake pipes pistons 59 and 60 are both subjected to the pressure of the air in the emergency pressure reservoir which is much greater than the pressure in the emergency line, and it is therefore necessary to provide means whereby the low pressure air can raise pistons 59 and 60 against the higher pressure and for this purpose the ball and cam device is used. When air is admitted to passage 49 and 38, piston 46 moves cam surface 41a towards the right and due to the wedge action of the conical surface the force exerted on piston 46 produces a lifting force that varies inversely with the angle that the inclined surface 41a makes with the axis of piston 46 and associated parts when the axes of pistons 59 and 60 are perpendicular to the axis of piston 46. It is therefore possible to control the application of the maximum air pressure in reservoir 31 with a much lower pressure in the emergency and the service lines.

Particular attention is directed to the fact that the addition of the diverter does not in any way alter the operation of the air brake system to which it is added.

What is claimed as new is:

1. A supply and exhaust valve mechanism for use in a brake system of the tractor and trailer type which has a pressure air reservoir and a supply conduit operatively interconnecting the said reservoir with the trailer brakes, comprising: a body having a passage extending therethrough connected in series with said conduit, a normally open valve means in said passage for controlling the flow of air to the brakes, an exhaust passage communicating that portion of the conduit between the normally open valve and the trailer brakes with the atmosphere, a normally closed valve means operatively associated with the last named exhaust passage, a cylinder, a plunger slidable in said cylinder, a resilient compressible element positioned between one end of the plunger and the corresponding end of the cylinder forming means for urging the plunger towards the other end of the cylinder which is closed by an end wall, the other end of the plunger having an air-tight fit with the cylinder, a passage connecting the space between the closed end of the cylinder and said other end of the plunger with a branch of the supply conduit connected between the reservoir and the normally open valve, second normally closed valve means in the last named passage, electromagnetic means operatively associated with said last mentioned valve to open the same and direct air into the cylinder between the closed end thereof and the plunger to move the latter against the force exerted thereon by the resilient element, and means associated with the plunger and the first mentioned normally open and closed valves for moving these valves to closed and open position respectively when the plunger moves in response to air pressure in the closed end of the cylinder and for returning said valves to normally open and closed position respectively when the plunger is returned in response to the action of the resilient element.

2. A mechanism in accordance with claim 1 in which the wall surrounding the closed space at the end of the plunger is provided with a bleed opening.

3. A supply and exhaust valve mechanism for use in brake systems of the tractor and trailer type having a pressure air reservoir and an air supply conduit operatively interconnecting the reservoir and the trailer brakes, comprising: a body having a passage forming a section of the air supply conduit, a normally open valve controlling the flow of air through said passage, an exhaust passage communicating that portion of the supply passage between said valve and the brakes with the atmosphere, a normally closed valve in the exhaust passage, a cylinder, a plunger slidable in said cylinder, a resilient compressible element in operative engagement with one end of the plunger, the end of the cylinder adjacent the other end of the plunger being closed, a branch conduit communicating the space between the closed end of the cylinder and the plunger with that part of the supply passage which is connected directly to the reservoir, a second normally closed valve controlling the flow of air through said branch conduit, electromagnetic means operatively associated with the second normally closed valve for moving it to open position to effect a movement of the plunger against the action of the resilient element, the plunger having two oppositely inclined frusto-conical surfaces, means associated with one of the frusto-conical surfaces and the first mentioned normally closed valve for moving said valve to open position when the plunger moves in response to air pressure in the closed end of the cylinder and for returning said valve to normally closed position when the plunger is returned in response to the action of the resilient element, and second means associated with the other of the frusto-conical surfaces and the normally open valve for moving said valve to closed position when the plunger moves in response to air pressure in the closed end of the cylinder and for returning said valve to normally open position when the plunger is returned in response to the action of the resilient elements.

4. A valve mechanism in accordance with claim 3 in which the resilient compressible element is a spring.

References Cited in the file of this patent
UNITED STATES PATENTS

| | | |
|---|---|---|
| 2,185,261 | Leupold | Jan. 2, 1940 |
| 2,188,200 | Cox | Jan. 23, 1940 |
| 2,434,050 | Price | Jan. 6, 1948 |
| 2,451,139 | Williams et al. | Oct. 12, 1948 |